US011928253B2

(12) United States Patent
Hori (10) Patent No.: US 11,928,253 B2
(45) Date of Patent: Mar. 12, 2024

(54) VIRTUAL SPACE CONTROL SYSTEM, METHOD FOR CONTROLLING THE SAME, AND CONTROL PROGRAM

(71) Applicant: TOYOTA JIDOSHA KABUSHIKI KAISHA, Toyota (JP)

(72) Inventor: Tatsuro Hori, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/960,397

(22) Filed: Oct. 5, 2022

(65) Prior Publication Data
US 2023/0114755 A1 Apr. 13, 2023

(30) Foreign Application Priority Data
Oct. 7, 2021 (JP) .................. 2021-165223

(51) Int. Cl.
*G06F 3/01* (2006.01)
*G06T 13/40* (2011.01)
*H04L 65/403* (2022.01)

(52) U.S. Cl.
CPC .............. *G06F 3/011* (2013.01); *G06T 13/40* (2013.01); *H04L 65/403* (2013.01)

(58) Field of Classification Search
CPC .......................... G06F 3/011; G06T 2219/024
See application file for complete search history.

(56) References Cited

U.S. PATENT DOCUMENTS

| | | | | |
|---|---|---|---|---|
| 6,298,374 B1* | 10/2001 | Sasaki | ..................... | H04L 41/00 709/204 |
| 6,753,857 B1* | 6/2004 | Matsuura | ................ | G06T 17/00 345/419 |
| 9,007,427 B2* | 4/2015 | Hoover | .................. | H04N 7/157 348/14.1 |
| 10,664,903 B1* | 5/2020 | Haitani | ................ | G02B 27/017 |
| 11,055,890 B2* | 7/2021 | Kim | ........................ | A63F 13/55 |
| 11,089,266 B2* | 8/2021 | Li | .......................... | G06T 13/40 |
| 11,394,925 B1* | 7/2022 | Faulkner | ................. | G06F 3/013 |

(Continued)

FOREIGN PATENT DOCUMENTS

| | | |
|---|---|---|
| JP | 2001-160154 A | 6/2001 |
| JP | 6737942 B1 | 8/2020 |
| WO | 2020/203999 A1 | 10/2020 |

Primary Examiner — Sepehr Azari
(74) Attorney, Agent, or Firm — Sughrue Mion, PLLC (57) ABSTRACT

A virtual space control system including: a plurality of user terminals; and a management apparatus configured to manage a virtual space in which virtual persons who operate in accordance with motions of users who are using the respective user terminals are located, in which each of the user terminals acquires information regarding a motion of the user who is using this user terminal and a surrounding environment of the user, determines, based on the acquired information, a mode of expressing a virtual person corresponding to a user who is using this user terminal in the virtual space, and displays the virtual space managed by the management apparatus on a monitor, and the management apparatus locates virtual persons who correspond to users who are using the respective user terminals expressed using the expression modes determined by the respective user terminals in the virtual space.

9 Claims, 6 Drawing Sheets

(56) References Cited

U.S. PATENT DOCUMENTS

| | | | |
|---|---|---|---|
| 11,488,362 B2* | 11/2022 | Abe | A63F 13/213 |
| 2006/0294465 A1* | 12/2006 | Ronen | H04M 1/576 |
| | | | 715/706 |
| 2008/0303830 A1* | 12/2008 | Fleury | G06T 13/40 |
| | | | 345/473 |
| 2009/0265642 A1* | 10/2009 | Carter | G06F 3/011 |
| | | | 715/757 |
| 2011/0230263 A1* | 9/2011 | Ng | A63F 13/49 |
| | | | 463/31 |
| 2011/0244952 A1* | 10/2011 | Schueller | G07F 17/3262 |
| | | | 463/31 |
| 2011/0304541 A1* | 12/2011 | Dalal | G06F 3/0346 |
| | | | 345/158 |
| 2012/0192088 A1* | 7/2012 | Sauriol | G06F 3/012 |
| | | | 715/757 |
| 2012/0324017 A1* | 12/2012 | Bellomo | G06Q 10/10 |
| | | | 709/205 |
| 2014/0245192 A1* | 8/2014 | Chavez | G06Q 10/00 |
| | | | 715/757 |
| 2017/0237940 A1* | 8/2017 | Chaney | H04N 7/142 |
| | | | 348/14.07 |
| 2017/0302709 A1* | 10/2017 | Jones | G06F 3/04817 |
| 2018/0189568 A1* | 7/2018 | Powderly | G06F 3/0304 |
| 2018/0329603 A1* | 11/2018 | Sawaki | G02B 27/017 |
| 2018/0373414 A1* | 12/2018 | Baba | G06F 3/0308 |
| 2019/0265945 A1* | 8/2019 | Newell | G06Q 30/02 |
| 2020/0134895 A1* | 4/2020 | Pollard | G06F 3/011 |
| 2020/0226811 A1* | 7/2020 | Kim | A63F 13/55 |
| 2020/0341541 A1* | 10/2020 | Olah-Reiken | G06F 3/011 |
| 2020/0371673 A1* | 11/2020 | Faulkner | G06F 3/017 |
| 2021/0263168 A1* | 8/2021 | Nguyen | G01S 19/396 |
| 2021/0325974 A1* | 10/2021 | Boissière | G06F 3/03 |
| 2021/0366174 A1* | 11/2021 | Reilly | H04R 3/005 |
| 2021/0392292 A1* | 12/2021 | Benman | H04N 7/157 |
| 2022/0068036 A1* | 3/2022 | Ng | G06F 3/017 |
| 2022/0124140 A1* | 4/2022 | Okina | G06V 40/20 |

* cited by examiner

VIRTUAL SPACE CONTROL SYSTEM, METHOD FOR CONTROLLING THE SAME, AND CONTROL PROGRAM

CROSS REFERENCE TO RELATED APPLICATIONS

This application is based upon and claims the benefit of priority from Japanese patent application No. 2021-165223, filed on Oct. 7, 2021, the disclosure of which is incorporated herein in its entirety by reference.

BACKGROUND

The present disclosure relates to a virtual space control system, a method for controlling the same, and a control program.

International Patent Publication No. WO 2020/203999 discloses a communication assistance system that analyzes video of a first user, selects a motion pattern corresponding to a visual line, a posture and the like of the first user from a group of motion patterns of an avatar, and displays an avatar who operates based on the selected motion pattern on a terminal of a second user.

SUMMARY

A large variety of events including a meeting, a yoga class and the like are held in a virtual space. It is required to express virtual persons of users who participate in an event to be held by an expression mode suitable for each of these events.

The present disclosure has been made in view of the aforementioned circumstances and aims to provide a virtual space control system, a method for controlling the same, and a control program capable of enabling a virtual person of a user who participates in an event held in a virtual space to be expressed in a mode that is appropriate for this event.

A virtual space control system according to the present disclosure is a virtual space control system including: a plurality of user terminals; and a management apparatus configured to manage a virtual space in which virtual persons who operate in accordance with motions of users who are using the respective user terminals are located, in which each of the user terminals acquires information regarding a motion of the user who is using this user terminal and a surrounding environment of the user, each of the user terminals determines, based on the acquired information, a mode of expressing a virtual person corresponding to a user who is using this user terminal in the virtual space, each of the user terminals displays the virtual space managed by the management apparatus on a monitor, and the management apparatus locates virtual persons who correspond to users who are using the respective user terminals expressed using the expression modes determined by the respective user terminals in the virtual space. This virtual space control system determines, based on the information regarding a motion of the user who is using the user terminal and a surrounding environment of the user, a mode of expressing the virtual person who corresponds to this user in the virtual space, thereby enabling the virtual person of the user who participates in an event held in the virtual space to be expressed in a mode that is appropriate for this event. When, for example, a user participates in a regular meeting at a workplace held in a virtual space, the movements of the upper body of the user such as a mouth movement, a change in facial expression, or a note-taking motion tend to become more intense than movements of the other parts of the body. Further, in this case, the user terminal is likely to be set in such a way that it detects movements of the upper body of the user (in particular, a mouth movement, a change in facial expression, a note-taking motion, etc.) with an accuracy higher than the accuracy with which movements of the other parts of the body are detected. For example, the camera provided in the user terminal is likely to be installed in such a way that it shoots only the upper body of the user U1. In this case, the user terminal employs a mode of expressing the virtual person that reflects the movements of the upper body of the user in the virtual person with an accuracy higher than the accuracy with which movements of the other parts of the body are detected. Alternatively, when the user participates in a yoga class held in a virtual space, the movement of the whole body of the user tends to become intense. Further, in this case, the user terminal is likely to be set in such a way that it can sense the movement of the whole body of the user. For example, the camera provided in the user terminal is likely to be installed in such a way that it shoots the whole body of the user U1. In this case, the user terminal employs a mode of expressing the virtual person that reflects the movement of the whole body of the user in the virtual person. That is, this virtual space control system enables a virtual person of a user who participates in an event held in the virtual space to be expressed in a mode that is appropriate for this event.

Each of the user terminals may further determine a mode of expressing the virtual person corresponding to the user who is using this user terminal in the virtual space in accordance with the content of an event in which the user who is using this user terminal participates. Accordingly, it is possible to express a virtual person of a user who participates in an event held in the virtual space in a mode that is appropriate for this event more accurately.

Each of the user terminals may further determine, based on whether the user who is using this user terminal is an organizer of a predetermined event or an equivalent person among a plurality of users gathering for the predetermined event, a mode of expressing the virtual person corresponding to the user who is using this user terminal in the virtual space. When, for example, the user is an instructor of a yoga class, the user terminal detects the movement of the whole body of the user with a high accuracy (an accuracy at least higher than the accuracy in the case in which the user is a participant of the yoga class) and employs a mode of expressing the virtual person that reflects the movement of the whole body of the user in the virtual person with a higher accuracy. Accordingly, the instructor of the yoga class is able to show correct yoga poses to participants. On the other hand, when the user is a participant of the yoga class, the user terminal detects the movement of the whole body of the user with a low accuracy (an accuracy at least lower than the accuracy in the case in which the user is the instructor of the yoga class) and employs a mode of expressing the virtual person that reflects the movement of the whole body of the user with a lower accuracy in the virtual person. Accordingly, the burden of image processing in the virtual space control system is reduced.

Each of the user terminals may extract information regarding a predetermined motion from the acquired information regarding the motion of the user, and the management apparatus may operate virtual persons who correspond to users who are using the respective user terminals in a virtual space based on the acquired information regarding the motion of the user, but not information regarding the predetermined motion of the user, in each of the user terminals. The management apparatus prevents, for example, predetermined motions of the user such as yawning, stretching, unconscious habits, a drinking motion, etc., among the motions of the user from being reflected in the movement of the virtual person. Accordingly, it is possible to avoid making other users who participate in the event feel uncomfortable.

Each of the user terminals may acquire information regarding a motion of the user who is using this user terminal and a surrounding environment of the user acquired by at least one of a microphone, a distance sensor, an operating terminal, and a camera.

A method for controlling a virtual space control system according to the present disclosure is a method for controlling a virtual space control system including: a plurality of user terminals; and a management apparatus configured to manage a virtual space in which virtual persons who operate in accordance with motions of users who are using the respective user terminals are located, the method including: acquiring, using each of the user terminals, information regarding a motion of the user who is using this user terminal and a surrounding environment of the user; determining, using each of the user terminals, a mode of expressing a virtual person corresponding to a user who is using this user terminal in the virtual space based on the acquired information; locating, using the management apparatus, virtual persons who correspond to users who are using the respective user terminals expressed using the expression modes determined by the respective user terminals, in the virtual space; and displaying, using each of the user terminals, the virtual space managed by the management apparatus on a monitor. This method for controlling the virtual space control system determines, based on the information regarding the motion of the user who is using the user terminal and a surrounding environment of the user, a mode of expressing the virtual person who corresponds to this user in the virtual space, thereby enabling the virtual person of the user who participates in an event held in the virtual space to be expressed in a mode that is appropriate for this event.

A control program according to the present disclosure is a control program of a virtual space control system, the virtual space control system including: a plurality of user terminals; and a management apparatus configured to manage a virtual space in which virtual persons who operate in accordance with motions of users who are using the respective user terminals are located, the control program causing a computer to execute the processing of: acquiring, using each of the user terminals, information regarding a motion of the user who is using this user terminal and a surrounding environment of the user; determining, using each of the user terminals, a mode of expressing a virtual person corresponding to a user who is using this user terminal in the virtual space based on the acquired information; locating, using the management apparatus, virtual persons who correspond to users who are using the respective user terminals expressed using the expression modes determined by the respective user terminals, in the virtual space; and displaying, using each of the user terminals, the virtual space managed by the management apparatus on a monitor. This control program determines, based on the information regarding the motion of the user who is using the user terminal and a surrounding environment of the user, a mode of expressing the virtual person who corresponds to this user in the virtual space, thereby enabling the virtual person of the user who participates in an event held in the virtual space to be expressed in a mode that is appropriate for this event.

According to the present disclosure, it is possible to provide a virtual space control system, a method for controlling the same, and a control program capable of enabling a virtual person of a user who participates in an event held in a virtual space to be expressed in a mode that is appropriate for this event.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be explained with reference to an embodiment of the present disclosure. However, the disclosure set forth in the claims is not limited to the following embodiment. Further, not all the structures explained in the embodiment may be necessary as means for solving the problem. For a purpose of clarifying the description, the following description and the drawings will be omitted and simplified as appropriate. Throughout the drawings, the same components are denoted by the same reference symbols and overlapping descriptions will be omitted as necessary.

First Embodiment

Figure 1:
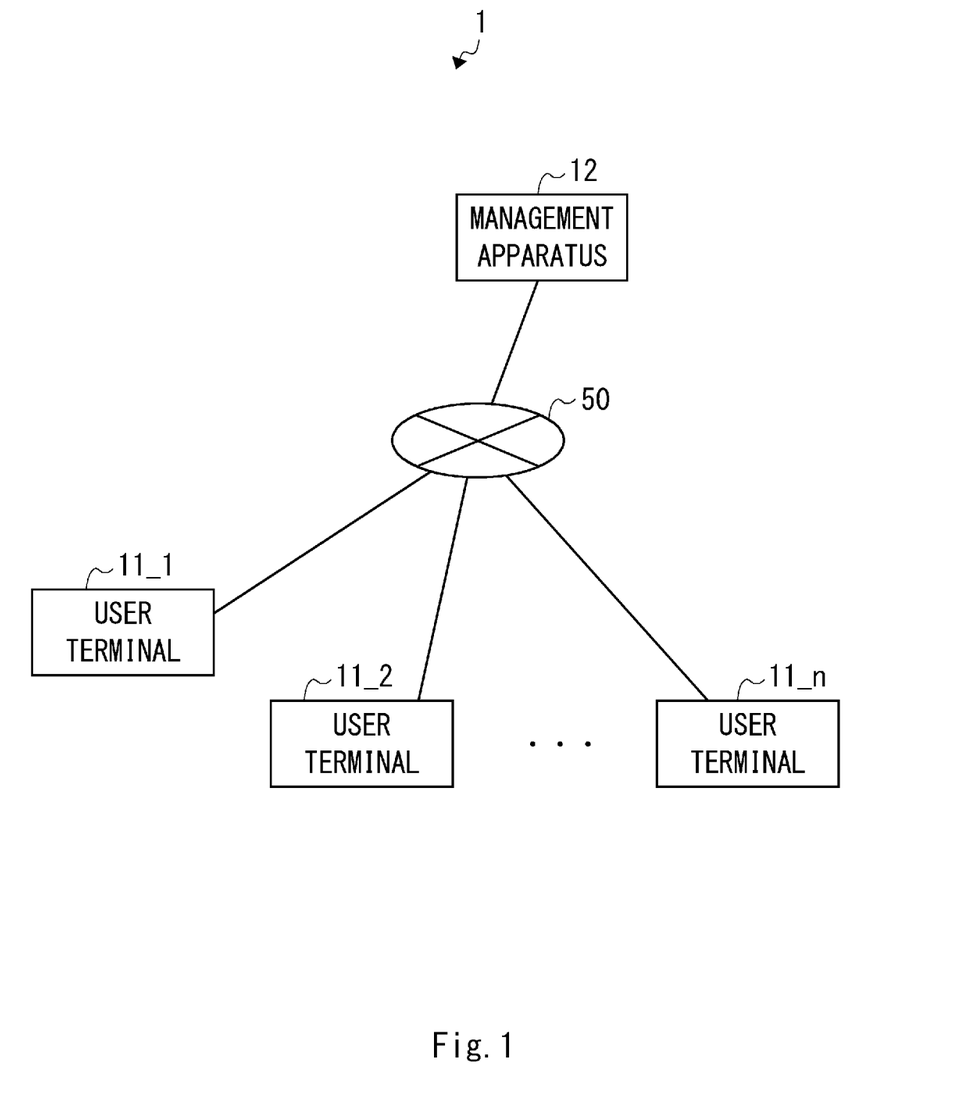
FIG. 1 is a block diagram showing a configuration example of a virtual space control system according to a first embodiment.

FIG. 1 is a block diagram showing a configuration example of a virtual space control system 1 according to a first embodiment. The virtual space control system 1 determines, based on information regarding a motion of a user who is using a user terminal and a surrounding environment of the user, a mode of expressing a virtual person who corresponds to this user in a virtual space, thereby enabling the virtual person of the user who participates in an event held in the virtual space to be expressed in a mode that is appropriate for this event. Hereinafter, this feature will be described in detail.

As shown in FIG. 1, the virtual space control system 1 includes n (n is an integer equal to or larger than two) user terminals 11, a management apparatus 12, and a network 50. In the following description, the n user terminals 11 are also referred to as user terminals 11_1-11_n. The user terminals 11_1-11_n and the management apparatus 12 are configured in such a manner that each of the user terminals 11_1-11_n and the management apparatus 12 can communicate with each other via the network 50.

The user terminals 11_1-11_n are terminals owned by users or temporarily allocated to the respective users and are capable of performing wireless communication. Each of the user terminals 11_1-11_n is, for example, a Personal Computer (PC) terminal, a smartphone, a tablet terminal, or a dedicated communication terminal prepared for this system. Each of the user terminals 11_1-11_n is installed in a private room of each user's home or installed in a dedicated room prepared for this system. Further, when the user terminals 11_1-11_n are mobile communication terminals such as smartphones, they may be held by the respective users.

The management apparatus 12 manages the virtual space operated by this system. Virtual persons (so-called avatars) who operate in accordance with motions of the respective users who are using the respective user terminals 11_1-11_n are located in the virtual space.

Figure 2:
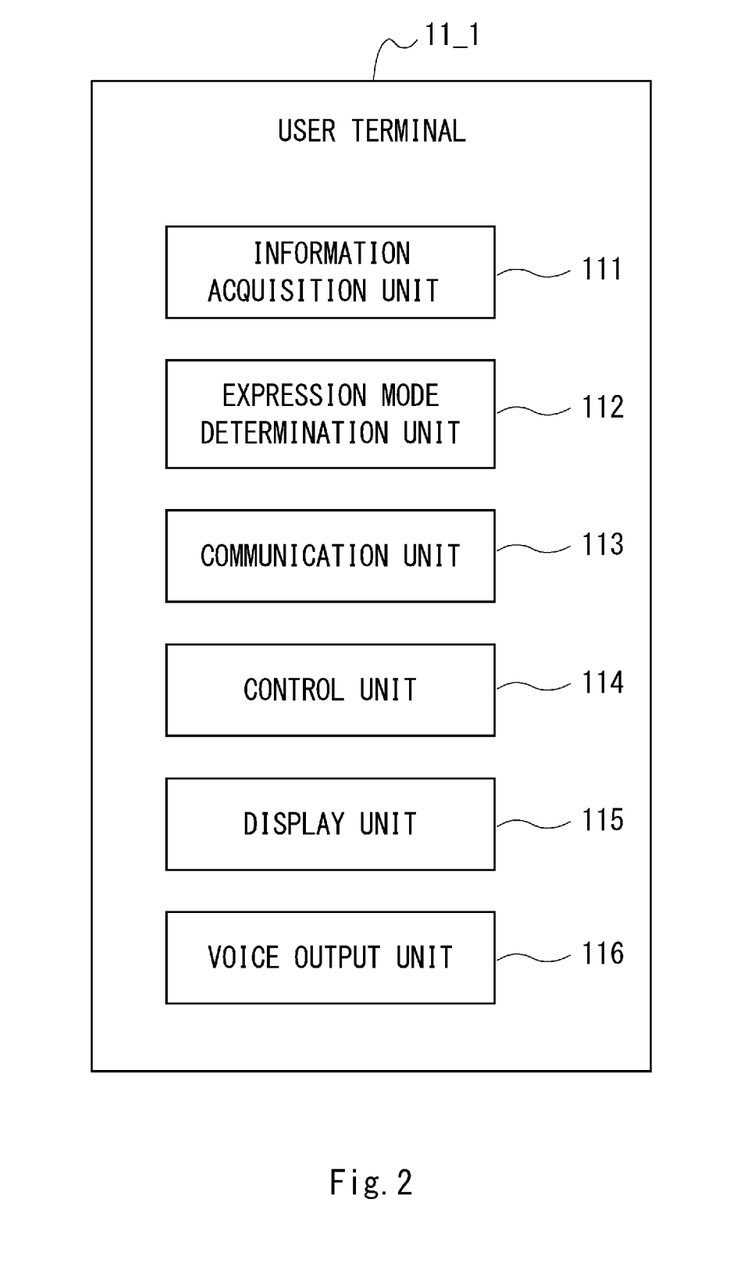
FIG. 2 is a block diagram showing a configuration example of a user terminal provided in the virtual space control system shown in FIG. 1.

FIG. 2 is a block diagram showing a configuration example of the user terminal 11_1. Since the configuration of the user terminals 11_2-11_n is basically similar to that of the user terminal 11_1, the descriptions thereof will be omitted.

As shown in FIG. 2, the user terminal 11_1 includes, for example, an information acquisition unit 111, an expression mode determination unit 112, a communication unit 113, a control unit 114, a display unit 115, and a voice output unit 116.

The information acquisition unit 111 acquires information regarding a motion of a user U1 who is using the user terminal 11_1, and a surrounding environment of the user U1.

The information acquisition unit 111 includes, for example, a camera. The information acquisition unit 111 acquires information on the shooting range of the user U1, facial expression of the user U1, and the skeleton of the user U1 as information regarding the motion of the user U1, and acquires the room brightness and an object placed near the user U1 as information regarding the surrounding environment of the user U1 by analyzing an image captured by the camera.

Further, the information acquisition unit 111 includes, for example, a microphone. The information acquisition unit 111 analyzes a voice collected by the microphone, thereby acquiring information on the voice that the user U1 has output or information on a room nose level.

The information acquisition unit 111 further includes, for example, an operating terminal such as a keyboard, and acquires information input by the user U1 via the operating terminal. The information input via the operating terminal is, for example, the content of the event in which the user U1 is planning to participate, additional information regarding the user U1, additional information regarding the surrounding environment (e.g., the type of the user terminal, the type of the room etc.).

Note that the information acquisition unit 111 is not limited to the aforementioned camera, microphone, and operating terminal and may include a desired apparatus capable of acquiring information regarding a motion of the user U1 and its surrounding environment. The information acquisition unit 111 may include, for example, a distance sensor capable of measuring the distance between the user U1 and the user terminal 11_1.

The expression mode determination unit 112 determines the mode of expressing the virtual person V1 who corresponds to the user U1 who is using the user terminal 11_1 in the virtual space.

When, for example, the user U1 participates in a regular meeting at a workplace held in a virtual space, movements of the upper body of the user U1 such as a mouth movement, a change in facial expression, or a note-taking motion tend to become more intense than movements of the other parts of the body. Further, in this case, the information acquisition unit 111 is likely to be set in such a way that it detects the movements of the upper body of the user U1 (in particular, a mouth movement, a change in facial expression, a note-taking motion, etc.) with an accuracy higher than the accuracy with which movements of the other parts of the body are detected. For example, the camera, which serves as the information acquisition unit 111, tends to be installed in such a way that it shoots only the upper body of the user U1. In this case, the expression mode determination unit 112 employs a mode of expressing the virtual person V1 that reflects the movements of the upper body of the user U1 in the virtual person V1 with an accuracy higher than the accuracy with which movements of the other parts of the body are detected.

Furthermore, when, for example, the user U1 participates in a yoga class held in a virtual space, the movement of the whole body of the user U1 tends to become intense. Further, in this case, the information acquisition unit 111 is likely to be set in such a way that it can sense the movement of the whole body of the user U1. For example, the camera, which serves as the information acquisition unit 111, is likely to be installed in such a way that it shoots the whole body of the user U1. In this case, the expression mode determination unit 112 employs a mode of expressing the virtual person V1 that reflects the movement of the whole body of the user U1 in the virtual person V1.

The expression mode determination unit 112 may determine the expression mode in accordance with, for example, the type of the room (e.g., whether the room is a private room where desk work is conducted or a wide room where a user can do exercise) instead of determining the expression mode in accordance with the camera shooting range (e.g., whether the camera is shooting the upper body or shooting the whole body). The type of the room is input, for example, to the user terminal 11_1 via an operating terminal or the like.

Further, the expression mode determination unit 112 may determine the mode of expressing the virtual person V1 in the virtual space in accordance with the content of the event in which the user U1 participates. The content of the event in which the user U1 participates is input, for example, to the user terminal 11_1 via an operating terminal or the like.

When, for example, the event in which the user U1 participates is a regular meeting at a workplace, the expression mode determination unit 112 may employ a mode of expressing the virtual person V1 that reflects only the movements of the upper body of the user U1 in the virtual person V1. Alternatively, when the event in which the user U1 participates is a yoga class or a walking event, the expression mode determination unit 112 may employ a mode of expressing the virtual person V1 that reflects the movement of the whole body of the user U1 in the virtual person V1. Accordingly, the expression mode determination unit 112 is able to reflect the movement of the user U1 that is suitable for the event in which the user U1 participates in the virtual person V1 more accurately.

Further, the expression mode determination unit 112 may determine the mode of expressing the virtual person V1 in the virtual space based on whether or not the user U1 is an organizer of the predetermined event or an equivalent person among a plurality of users gathering for the predetermined event. Whether or not the user U1 is the organizer of the predetermined event or the equivalent person is input, for example, to the user terminal 11_1 via an operating terminal or the like.

When, for example, the user U1 is an instructor of the yoga class, the expression mode determination unit 112 may employ a mode of expressing the virtual person V1 that reflects the movement of the whole body of the user U1 in the virtual person V1 with a high accuracy (an accuracy at least higher than the accuracy in the case in which the user U1 is a participant of the yoga class). In this case, the information acquisition unit 111 preferably detects the movement of the whole body of the user U1 with a high accuracy (an accuracy at least higher than the accuracy in the case in which the user U1 is a participant of the yoga class). Accordingly, the instructor of the yoga class is able to show correct yoga poses to participants. On the other hand, when the user U1 is a participant of the yoga class, the expression mode determination unit 112 may employ a mode of expressing the virtual person V1 that reflects the movement of the whole body of the user U1 in the virtual person V1 with a low accuracy (an accuracy at least lower than the accuracy in the case in which the user is the instructor of the yoga class). In this case, the information acquisition unit 111 preferably detects the movement of the whole body of the user U1 with a low accuracy (an accuracy at least lower than the accuracy in the case in which the user is the instructor of the yoga class). Accordingly, the burden of image processing in the virtual space control system 1 is reduced.

The communication unit 113 transmits or receives data (information) to or from the management apparatus 12 via the network 50. The communication unit 113 transmits, for example, information acquired by the information acquisition unit 111 and information regarding the mode of expressing the virtual person V1 determined by the expression mode determination unit 112 to the management apparatus 12 via the network 50. Accordingly, the management apparatus 12 locates a virtual person V1 who corresponds to the user U1 expressed using the expression mode determined by the user terminal 11_1 in a virtual space.

Note that the communication unit 113 may transmit information regarding the motion of the user U1, but not information regarding a predetermined motion of the user, acquired by the information acquisition unit 111 to the management apparatus 12. In this case, the management apparatus 12 causes the virtual person V1 to operate in the virtual space based on the information regarding the motion of the user U1, but not information regarding a predetermined motion of the user, acquired by the information acquisition unit 111. For example, the management apparatus 12 prevents predetermined motions such as yawning, stretching, unconscious habits, a drinking motion among the motions of the user U1 from being reflected in the movement of the virtual person. Accordingly, it is possible to avoid making other users who participate in the event feel uncomfortable. Note that the processing of excluding information regarding a predetermined motion from the information regarding the motion of the user U1 is not necessarily performed in the user terminal 11 and may instead be performed in the management apparatus 12.

Further, the communication unit 113 receives information regarding the virtual space managed by the management apparatus 12 via the network 50.

The control unit 114 controls the user terminal 11_1 as a whole. The display unit 115 displays the virtual space managed by the management apparatus 12. The voice output unit 116, which is typically a speaker, outputs a voice in the virtual space managed by the management apparatus 12.

Figure 3:
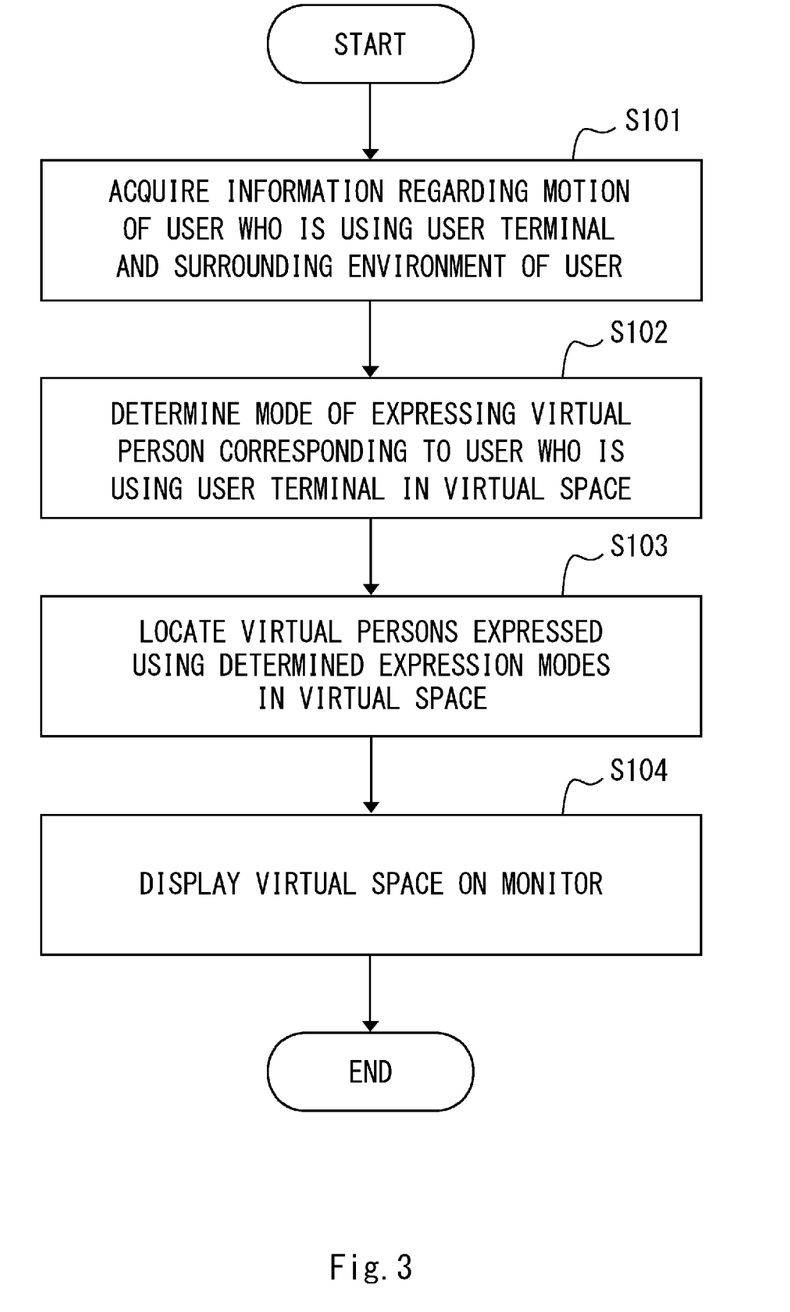
FIG. 3 is a flowchart showing an operation of the virtual space control system shown in FIG. 1.

Referring next to FIG. 3, operations of the virtual space control system 1 will be explained.

FIG. 3 is a flowchart showing the operations of the virtual space control system 1.

First, each of the user terminals 11_1-11_n acquires information regarding each user's motion and the surrounding environment of this user (Step S101).

After that, each of the user terminals 11_1-11_n determines the mode of expressing the virtual person who corresponds to the user in the virtual space based on the acquired information (Step S102).

After that, the management apparatus 12 locates the virtual persons expressed using the expression modes determined in the respective user terminals 11_1-11_n in the virtual space (Step S103).

After that, in each of the user terminals 11_1-11_n, the virtual space managed by the management apparatus 12 is displayed on the display unit (monitor) (Step S104).

Figure 4:
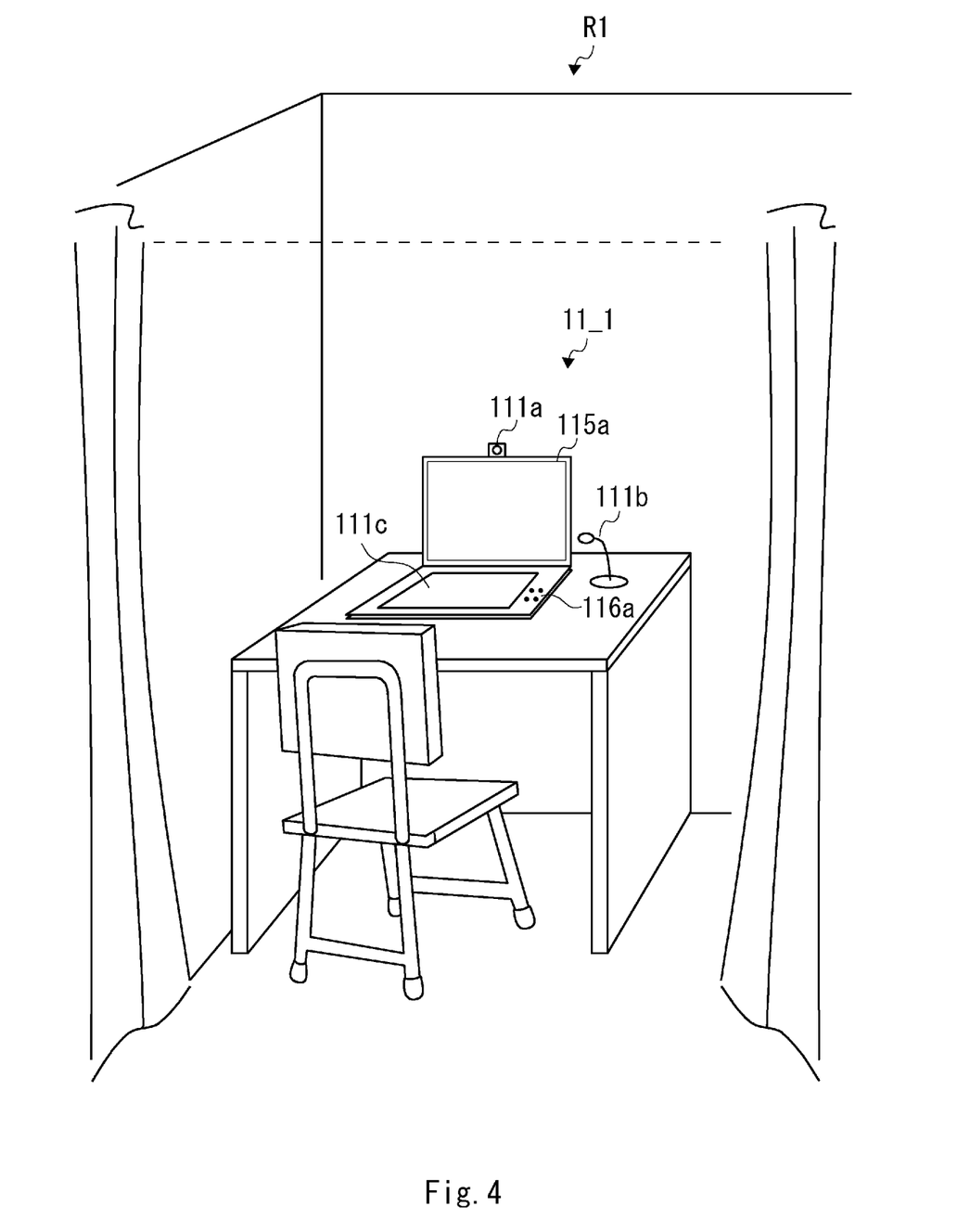
FIG. 4 is a schematic view showing one example of the user terminal provided in the virtual space control system shown in FIG. 1 and its surrounding environment.

FIG. 4 is a schematic view showing one example of the user terminal 11_1, which is one of the user terminals 11_1-11_n, and its surrounding environment.

With reference to FIG. 4, the user terminal 11_1, which is, for example, a PC terminal, is installed in a private room R1 of the user's home. In the PC terminal, which corresponds to the user terminal 11_1, a camera 111a, a microphone 111b, and a keyboard 111c are provided as the information acquisition unit 111, a monitor 115a is provided as the display unit 115, and a speaker 116a is provided as the voice output unit 116. The user terminal 11_1 is mainly used by the user U1 to participate in a meeting held in a virtual space. Therefore, the camera 111a is installed in such a way that it can shoot only the upper body of the user U1 who uses the user terminal 11_1. Therefore, the user terminal 11_1 employs a mode of expressing the virtual person V1 that reflects, based on the information acquired by the information acquisition unit 111 (e.g., information on the shooting range of the user U1 by the camera 111a or an event input via the keyboard 111c), the movements of the upper body of the user U1 in the virtual person V1 with an accuracy higher than the accuracy with which movements of the other parts of the body are detected.

Figure 5:
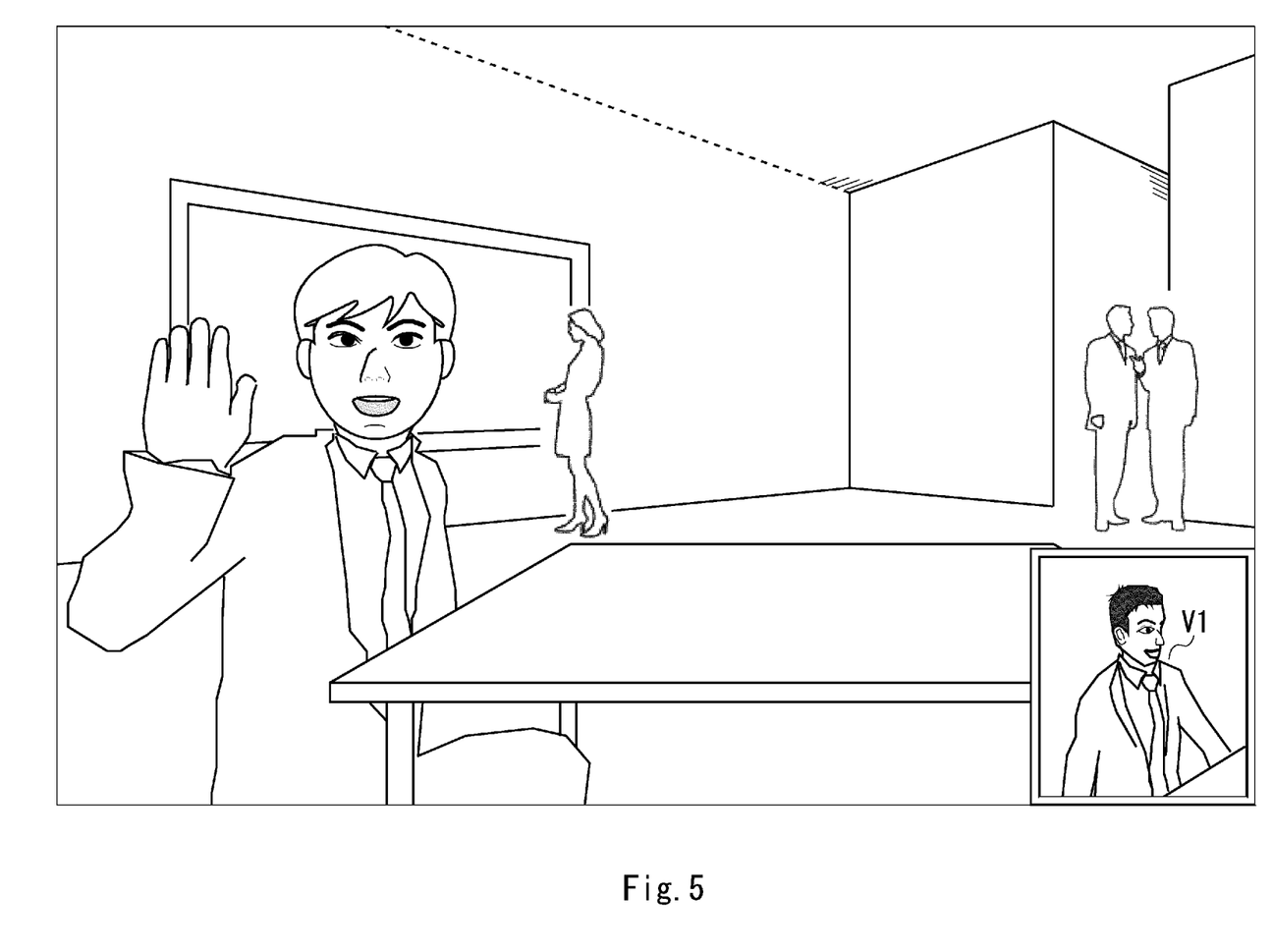
FIG. 5 is a schematic view showing one example of contents displayed on a display unit of the user terminal provided in the virtual space control system shown in FIG. 1.

FIG. 5 is a schematic view showing one example of the contents displayed in the monitor 115a of the user terminal 11_1. With reference to FIG. 5, virtual persons of participants of a meeting held in the virtual space are displayed on the monitor 115a. Note that the virtual person V1 of the user U1 who is using the user terminal 11_1 is displayed in a lower right frame of the monitor 115a. As will be clear from FIG. 5, in the meeting, attention tends to focus on the movements of the upper bodies of the participants (in particular, a mouth movement, a change in facial expression, a note-taking motion and the like). Accordingly, the user terminal 11_1 employs a mode of expressing the virtual person V1 that reflects the movements of the upper body of the user U1 in the virtual person V1 with an accuracy higher than the accuracy with which movements of the other parts of the body are detected.

Figure 6:
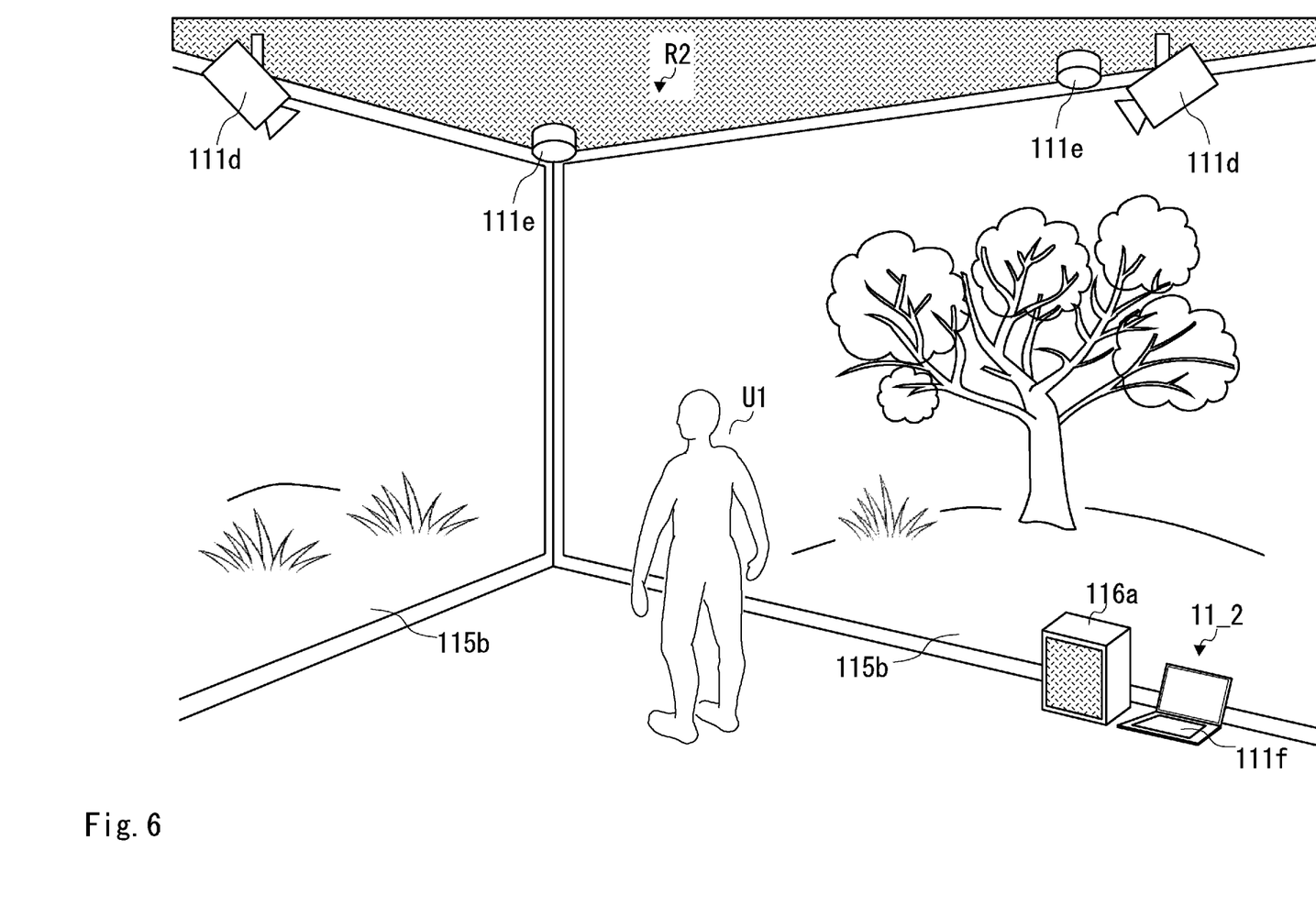
FIG. 6 is a schematic view showing another example of the user terminal provided in the virtual space control system shown in FIG. 1 and its surrounding environment.

FIG. 6 is a schematic view showing one example of the user terminal 11_2, which is one of the user terminals 11_1-11_n, and its surrounding environment.

Referring to FIG. 6, the user terminal 11_2, which is, for example, a dedicated communication terminal, is installed, for example, in a dedicated room (a rental room or the like) R2 prepared for a walking event. In the communication terminal, which is the user terminal 112, cameras 111d, sound collectors 111e, and a keyboard 111f are provided as the information acquisition unit 111, and monitors 115b are provided as the display unit 115 so as to cover the entire wall, and a speaker 116a is provided as the voice output unit 116. As described above, the user terminal 11_2 is used to enable a user to participate in a walking event held in a virtual space. Therefore, the cameras 111a are installed in such a way that they can shoot the whole body of one or more users U2 who uses the user terminal 11_2. Accordingly, the user terminal 11_2 employs a mode of expressing the virtual person V2 that reflects the movement of the whole body of the user U2 in the virtual person V2 based on the information acquired by the information acquisition unit 111.

As described above, the virtual space control system 1 according to the embodiment is able to determine, based on the information regarding a motion of the user who is using the user terminal and a surrounding environment of the user, a mode of expressing a virtual person who corresponds to this user in the virtual space, thereby enabling the virtual person of the user who participates in an event held in the virtual space to be expressed in a mode that is appropriate for this event.

While the present disclosure has been described as a hardware configuration in the aforementioned embodiments, the present disclosure is not limited thereto. The present disclosure is able to achieve the processing of controlling the virtual space control system 1 by causing a Central Processing Unit (CPU) to execute a computer program.

The aforementioned program includes instructions (or software codes) that, when loaded into a computer, cause the computer to perform one or more of the functions described in the embodiments. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A virtual space control system comprising:
   a plurality of user terminals; and
   a management apparatus configured to manage a virtual space in which virtual persons who operate in accordance with motions of users who are using the respective user terminals are located, wherein
   each of the user terminals acquires information regarding a motion of the user who is using this user terminal and a surrounding environment of the user,
   each of the user terminals determines, based on the acquired information, a mode of expressing a virtual person corresponding to a user who is using this user terminal in the virtual space, wherein the mode of expressing the virtual person specifies an accuracy level for expressing movement of one or more portions of the virtual person relative to corresponding movement of one or more portions of a corresponding user, the accuracy level being determined based at least on the surrounding environment,
   each of the user terminals displays the virtual space managed by the management apparatus on a monitor, and
   the management apparatus locates virtual persons who correspond to users who are using the respective user terminals expressed using the expression modes determined by the respective user terminals in the virtual space.

2. The virtual space control system according to claim 1, wherein each of the user terminals further determines a mode of expressing the virtual person corresponding to the user who is using this user terminal in the virtual space in accordance with the content of an event in which the user who is using this user terminal participates.

3. The virtual space control system according to claim 1, wherein each of the user terminals further determines, based on whether the user who is using this user terminal is an organizer of a predetermined event or an equivalent person among a plurality of users gathering for the predetermined event, a mode of expressing the virtual person corresponding to the user who is using this user terminal in the virtual space.

4. The virtual space control system according to claim 1, wherein
   each of the user terminals extracts information regarding a predetermined motion from the acquired information regarding the motion of the user, and
   the management apparatus operates virtual persons who correspond to users who are using the respective user terminals in a virtual space based on the acquired information regarding the motion of the user, but not information regarding the predetermined motion of the user, in each of the user terminals.

5. The virtual space control system according to claim 1, wherein each of the user terminals acquires information regarding a motion of the user who is using this user terminal and a surrounding environment of the user acquired by at least one of a microphone, a distance sensor, an operating terminal, and a camera.

6. The virtual space control system according to claim 1, wherein the accuracy level for expressing movement of the one or more portions of the virtual person corresponding to a user is specified in comparison to an accuracy level for expressing corresponding movement of one or more portions of a virtual person corresponding to another user.

7. The virtual space control system according to claim 1, wherein the mode of expressing the virtual person specifies different accuracy levels for different portions of the virtual person, based on the acquired information.

8. A method for controlling a virtual space control system comprising:
   a plurality of user terminals; and a management apparatus configured to manage a virtual space in which virtual persons who operate in accordance with motions of users who are using the respective user terminals are located, the method comprising:

acquiring, using each of the user terminals, information regarding a motion of the user who is using this user terminal and a surrounding environment of the user;

determining, using each of the user terminals, a mode of expressing a virtual person corresponding to a user who is using this user terminal in the virtual space based on the acquired information, wherein the mode of expressing the virtual person specifies an accuracy level for expressing movement of one or more portions of the virtual person relative to corresponding movement of one or more portions of a corresponding user, the accuracy level being determined based at least on the surrounding environment;

locating, using the management apparatus, virtual persons who correspond to users who are using the respective user terminals expressed using the expression modes determined by the respective user terminals, in the virtual space; and displaying, using each of the user terminals, the virtual space managed by the management apparatus on a monitor.

9. A non-transitory computer readable medium storing a control program of a virtual space control system, the virtual space control system comprising:

a plurality of user terminals; and a management apparatus configured to manage a virtual space in which virtual persons who operate in accordance with motions of users who are using the respective user terminals are located, the control program causing a computer to execute the processing of:

acquiring, using each of the user terminals, information regarding a motion of the user who is using this user terminal and a surrounding environment of the user;

determining, using each of the user terminals, a mode of expressing a virtual person corresponding to a user who is using this user terminal in the virtual space based on the acquired information, wherein the mode of expressing the virtual person specifies an accuracy level for expressing movement of one or more portions of the virtual person relative to corresponding movement of one or more portions of a corresponding user, the accuracy level being determined based at least on the surrounding environment;

locating, using the management apparatus, virtual persons who correspond to users who are using the respective user terminals expressed using the expression modes determined by the respective user terminals, in the virtual space; and displaying, using each of the user terminals, the virtual space managed by the management apparatus on a monitor.

\* \* \* \* \*